United States Patent [19]

Hellriegel

[11] Patent Number: 4,463,983
[45] Date of Patent: Aug. 7, 1984

[54] VEHICLE ROOF WITH A MOVABLE PORTION

[75] Inventor: Edmund Hellriegel, Pulheim, Fed. Rep. of Germany

[73] Assignee: Ford Motor Company, Dearborn, Mich.

[21] Appl. No.: 359,009

[22] Filed: Mar. 17, 1982

[51] Int. Cl.³ ............................................. B60J 7/18
[52] U.S. Cl. .................................... 296/213; 296/216; 296/221
[58] Field of Search ................. 296/216, 222, 221, 213

[56] References Cited

U.S. PATENT DOCUMENTS 1,854,972  4/1932  Austin ................................. 296/222
2,190,462  2/1940  Votypka ............................. 296/216
4,346,932  8/1982  Imata ................................. 296/216

FOREIGN PATENT DOCUMENTS 683772  11/1939  Fed. Rep. of Germany ...... 296/222
478428   2/1938  United Kingdom ............... 296/222

Primary Examiner—Robert R. Song
Attorney, Agent, or Firm—Daniel M. Stock; Clifford L. Sadler

[57] ABSTRACT

A vehicle roof with a movable portion is provided which covers a roof opening accompanied by lateral drip mouldings and can be pushed back along guideways formed in the drip mouldings over the fixed roof portion. The movable roof portion (1) is in the form of a sandwich component, preferably made of plastic, which covers the whole width of the roof and is supported with lateral slide flanges (11) directly on the basis of the lateral external drip mouldings (9) of the roof frame (3) by means of an elastic sealing material (12). The movable roof portion (1) is pivotally supported at its leading edge to the roof frame (3) and fixed at its rear edge by a separable toggle hinge (22). The movable roof part (1) can be pushed back over the roof external surface after opening of its rear edge and releasing of the toggle hinge (22) by hand, whereby the lateral slide-flanges (11) are received by guideways (15) of the lateral rainwater deflectors (14).

4 Claims, 6 Drawing Figures

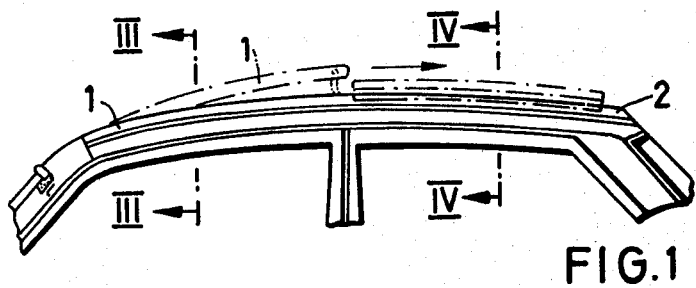
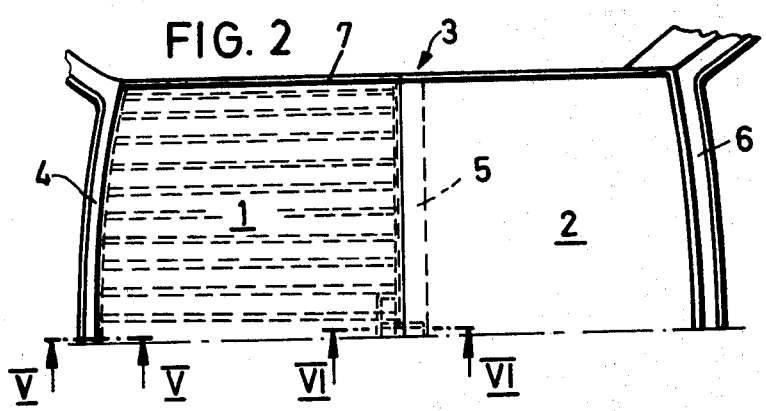
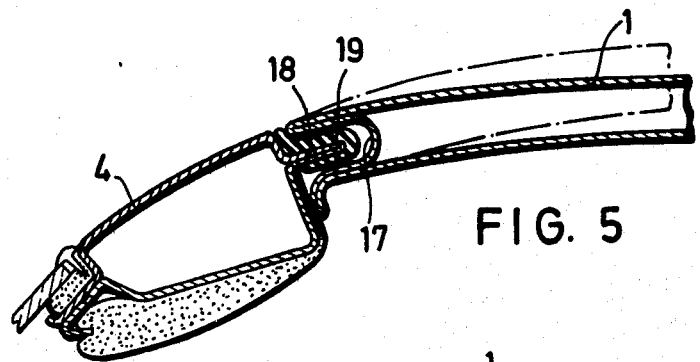
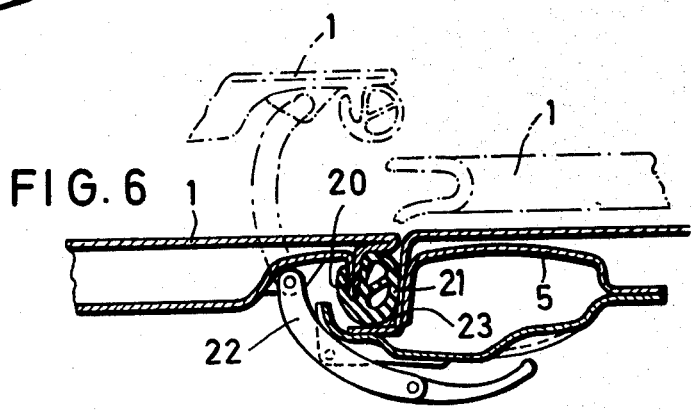

VEHICLE ROOF WITH A MOVABLE PORTION

TECHNICAL FIELD

The present invention relates generally to vehicle roofs and more specifically to a vehicle roof with a movable portion.

BACKGROUND ART

A vehicle roof of approximately this type is shown in German laid-open Patent DE-AS No. 20 53 086. A roof is disclosed in which lateral guide tracks for a movable roof portion are disposed as a U-shaped frame on the roof surface adjacent to the roof opening and extend back over the fixed part of the roof.

This vehicle roof has the disadvantage that the movable roof portion can be disposed flush with the roof surface only at its leading edge, while its rear edge is displaced a relatively large distance from the surface of the fixed part of the roof.

In British Patent GB-PS No. 478 428, to which reference is made in the first-mentioned laid-open patent, there is disclosed a guideway moulded into each of the walls of the lateral drip moulding for the movable roof portion. Here, too, the lateral drip mouldings extend beyond the roof-opening and over the fixed portion of the roof.

This vehicle roof has the same disadvantage as the fist-mentioned one and in addition requires a costly deformation of the roof in order to form the guide tracks in the walls of the lateral drip mouldings.

SUMMARY OF THE INVENTION

It is an object of the present invention to provide an improved vehicle roof with a movable portion that in the closed position lies fully flush with the roof surface, that can be opened for ventilation purposes at its rear edge, which can be pushed back over the fixed part of the roof and which is extremely simply manufactured and assembled in order to open a roof aperture exposing almost the whole width of the roof.

According to one feature of the invention this object is accomplished in a vehicle roof wherein the movable part of the roof is in form of a sandwich component, preferably made of plastic, covering the whole width of the roof which is supported with lateral slide-flanges supported on the base of the lateral outer drip mouldings of the roof frame by means of an elastic sealing material. The movable roof portion is formed as a shell shape which can be simply made of plastic and which can be assembled simply from the outside.

According to another feature of the invention the movable portion of the roof is provided at its leading edge with a bearing groove by which it is pivotally supported on a sealing strip fixed to the leading edge of the roof opening; and the roof is further provided at its rear edge with a sealing strip fixed to a cross bar which is sealed via a detachable toggle hinge against a rear internal drip moulding. By the provision of the bearing groove and rear edge sealing mechanism opening of the movable portion of the roof for ventilation purposes can be effected with a minimum effort.

According to another feature of the invention the lateral drip mouldings running in the area of the fixed part of the roof are in the form of lateral rainwater deflectors, which are provided with guide tracks for the lateral slide flanges raised by approximately the thickness of the movable part of the roof, whereby the manual pushing of the movable portion of the vehicle roof is made possible with a minimum of effort.

According to another feature of the invention the lateral rainwater deflectors forming the lateral drip mouldings are formed in one piece as plastic parts which in the area of the front part of the roof directly carry the sealing material and in the area of the rear part of the roof directly receive the guide tracks for the slide flanges of the movable portion of the roof. This permits a particularly advantageous formation of the roof side panels, whereby the rainwater deflectors perform several functions, such as the draining away of water and providing supporting and guiding profile for the movable portion of the roof.

According to another feature of the invention the lateral rainwater deflectors may be formed in one piece with an integrally formed roof luggage rack.

According to another feature of the invention both the movable portion of the roof and the fixed portion of the roof can be formed as a self-supporting cellular structure, which has trapezoidal section ribs running in the longitudinal direction of the vehicle. It is thereby possible to achieve a level exterior of the roof, while the interior of the roof can be provided with an internal lining as desired.

BRIEF DESCRIPTION OF THE DRAWINGS

The invention is explained in greater detail with the aid of the accompanying detailed description of an exemplified embodiment illustrated in the accompanying drawings wherein:

FIG. 1 is a side view of a vehicle roof according to the invention;
FIG. 2 is a partial top view of a vehicle roof according to FIG. 1;
FIG. 5 is a section along the line V—V in FIG. 2
and
FIG. 6 is a section along the line VI—VI in FIG. 2.

DESCRIPTION OF THE PREFERRED EMBODIMENT

Figure 3:
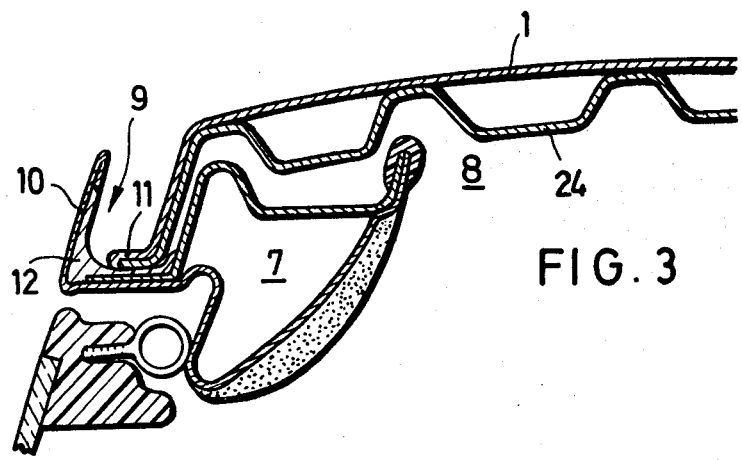
FIG. 3 is a section along the line III—III in FIG. 1.

In FIGS. 1 and 2 a vehicle roof consists of a front movable portion 1 and a rear fixed portion 2 which are both in the form of a sandwich component or a cellular structure made of plastic. The roof portions 1 and 2 are connected with a roof frame arrangement 3 which, in connection with the roof columns, is formed as a supporting sheet metal construction.

The roof frame arrangement 3 here consists basically of a front roof frame cross member 4, a central beam 5 and a rear roof frame cross member 6 which are connected to each other by means of lateral roof frame side bars 7.

The movable roof part 1 is here indicated in FIG. 1 in dash-dot lines in its opened position and also in its pushed-back position.

The roof opening 8 determined by the roof frame arrangement 3 here extends over almost the entire width of the roof and is bordered by longitudinally extending lateral drip mouldings 9, which are formed from lateral rainwater deflectors 10. The lateral rainwater deflectors 10 here extend at the side of the fixed roof part 2 to the end of the vehicle roof.

Figure 4:
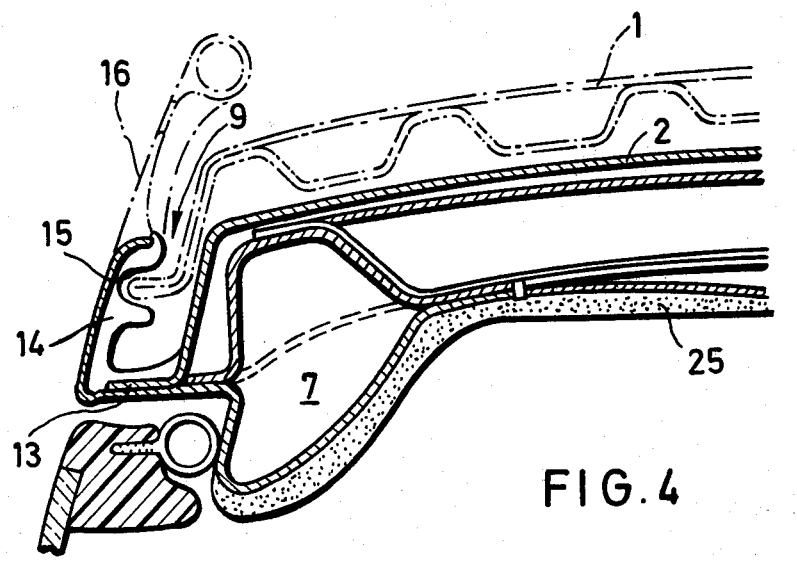
FIG. 4 is a section along the line IV—IV in FIG. 1.

From FIGS. 3 and 4, which show vertical cross-sections through the front and rear edges of the vehicle roof, it can be seen that both the movable roof portion 1 and also the fixed roof portion 2 are in the form of plastic shell-shaped components, wherein the movable roof portion 1 has lateral slide flanges 11 by which it is supported on an elastic sealing material 12 in the area of the drip moulding 9, and wherein the fixed roof portion 2 has similar lateral slide flanges 13, by which it is connected with the roof frame 3 through side bars 7 and the beam 5 and the rear roof frame cross member 6 by adhesion.

The rainwater deflectors 10 which form drip mouldings 9 can, as shown in FIG. 3, be formed as part of the roof frame side bars 7, and can be further formed as one-piece parts 14, as shown in FIG. 4, to provide guide tracks 15 for the movable roof portion 1.

According to another embodiment of the invention both the rainwater deflectors 10 and also the guide track parts 14 can be formed in one piece with an integrally formed roof luggage rack 16 as indicated in FIG. 4 in dash-dot lines. The configuration of the roof luggage rack 16 can be made in such a way that the sliding function of the movable roof part can be retained.

In FIGS. 5 and 6 the particularly simple bearing and sealing of the movable roof portion 1 can be seen. The movable roof portion 1 for this purpose is provided at its leading edge with a bearing groove 17, by which it is supported on a sealing strip 19 disposed on a flange 18 of the front roof frame cross member 4. The movable roof portion 1 is provided at its rear edge with a cross piece 20, on which a sealing strip 21 is disposed by which it is sealed and supported under the effect of a toggle hinge 22 against a rear internal drip moulding 23.

By means of the separable toggle hinge 22 the movable roof portion 1 can be opened at its rear edge in a known manner, in order to perform a ventilation function. The sliding opening of the movable roof portion 1 is effected by separation of the toggle hinge 22 as indicated in dash and dot lines in FIG. 6 and manual pushing of the roof portion 1 to move the lateral slide flanges 11 of the movable roof portion 1 to engage the guideways 15 in the rear area of the rainwater deflectors 14. For a hingeless sliding movement of the movable roof portion 1 expanding shoes can be provided in a known manner. Alternatively, known clamping devices can be provided in the movable roof portion 1, which can be made operative to fix the roof part in an intermediate position and prevent unintentional displacement. In a particularly preferable manner this kind of clamping device can be disposed in the area of the beam 5 and operatively connected with the toggle hinge 22.

Both the movable roof portion 1 and also the fixed roof portion 2 can be formed with a smooth external surface, while on their internal surface they can be provided with ribs 24 having a trapezoidal section and running in the longitudinal direction of the vehicle. As desired the internal side of the roof parts as shown in FIG. 3 for the movable roof portion 1, can be left visible or, as shown in FIG. 4 for the fixed roof portion 2, covered by a coresponding internal roof lining 25.

The movable roof portion 1 and also the fixed roof portion 2 can be in the form of plastic components which can be made by both the injection moulding and vacuum moulding method, whereby a wide variety of suitable plastics can be used.

What is claimed is:

1. A vehicle roof having a frame, means defining an opening through the roof having leading and rear edges and a movable roof portion slidably movable over a fixed portion of the roof to uncover the opening, characterized in that lateral external drip mouldings having a laterally extending base surface are provided on the roof frame, elastic sealing means are carried on the drip moulding base surfaces, the movable roof portion is formed from a plastic as a sandwich-like component to substantially span the width of the roof and includes means defining lateral slide flanges slidingly receivable in the drip moulding, engaging the sealing means and being directly supported on the drip mouldings base surfaces through the sealing means, a flange is provided extending inwardly from the leading edge of the roof opening, a sealing strip is mounted on the flange, a bearing groove is defined on the leading edge of the movable roof portion for receiving the sealing strip to permit pivotal movement of the roof movable portion thereabout, an internally extending roof opening drip moulding is provided at the rear edge of the roof opening, a cross bar is provided proximate the rear edge of the movable roof portion, a sealing strip is carried on the cross bar to sealingly engage the internally extending roof opening drip moulding, and a detachable toggle hinge is operatively disposed between the fixed and movable portions of the roof to urge the sealing strip into engagement with the internally extending roof opening drip moulding.

2. A vehicle roof as defined in claim 1 further characterized in that the roof lateral external drip mouldings are formed as laterally disposed rainwater deflectors having disposed therein guideways for receiving the movable roof portion slide flanges.

3. A vehicle roof as defined in claim 2 further characterized in that the laterally disposed rainwater deflectors are formed as unitary longitudinally extending parts including means registering longitudinally with the roof opening for mounting the elastic sealing means and means registering longitudinally with the fixed roof portion for receiving the slide flanges of the movable roof portion.

4. A vehicle roof as defined in claim 3 further characterized in that the laterally disposed rainwater deflectors are integrally formed with a generally vertically extending roof luggage rack.

* * * * *